United States Patent [19]

Jusionis

[11] Patent Number: 5,310,982
[45] Date of Patent: May 10, 1994

[54] T-JOINT WELDING FIXTURE

[75] Inventor: Vytautas J. Jusionis, Fountain Valley, Calif.

[73] Assignee: Hobart Brothers Company, Troy, Ohio

[21] Appl. No.: 53,097

[22] Filed: Apr. 26, 1993

[51] Int. Cl.⁵ .............................................. B23K 9/12
[52] U.S. Cl. .................................. 219/61; 219/60 R; 219/125.11
[58] Field of Search ............. 219/74, 60.2, 61, 125.11, 219/60 R, 60 A

[56] References Cited

U.S. PATENT DOCUMENTS

| | | | |
|---|---|---|---|
| 4,243,868 | 1/1981 | Graham | 219/60 A |
| 4,357,515 | 11/1982 | Kiefer et al. | 219/60 A |
| 4,554,429 | 11/1985 | Kazlauskas | |
| 4,629,853 | 12/1986 | Yttergren et al. | 219/60 A |
| 5,220,144 | 6/1993 | Jusionis | |

FOREIGN PATENT DOCUMENTS 1926866 2/1971 Fed. Rep. of Germany ..... 219/60.2

Primary Examiner—Clifford C. Shaw
Attorney, Agent, or Firm—Biebel & French

[57] ABSTRACT

A method and apparatus for welding a branch tube to a header tube includes a fixture having a pair of clamps for supporting the fixture on the header tube. A welding head on the fixture includes a clamp to hold the branch tube in place relative to the header tube. The welding head also includes a collet extending into contact with the header tube. The header tube, the collet and the welding head form a limited volume chamber that contains shielding gas in the vicinity of the joint between the branch tube and the header tube. The welding head includes a mechanism for rotating a tungsten welding electrode around the intersection of the branch tube and the header tube to form the welded joint.

3 Claims, 5 Drawing Sheets

T-JOINT WELDING FIXTURE

BACKGROUND OF THE INVENTION

This invention relates to an improved T-Joint welding fixture.

Welding of a branch tube or pipe to a header tube or pipe by the TIG welding process requires that a shielding gas be maintained around the joint during the process. In prior art devices, a large volume of air or gas surrounds the joint thus requiring considerable time to purge the air and insure that the shielding gas is sufficient to protect the weld joint before welding actually begins.

SUMMARY OF THE INVENTION

The present invention relates to an improved welding fixture for use in welding a branch tube to a header tube. Specifically, the fixture includes a frame member that support the fixture on the header tube. This is preferably done by means of a pair of clamps carried on the frame member. These clamps are conventional and include collets for securing the frame to the header tubes of various sizes. The fixture also carries a welding head of the type shown in U.S. Pat. No. 5,220,144, which is incorporated by reference into the present application. That welding head includes a clamp for holding the branch tube in place relative to the header tube and said fixture, and further, it includes a collet extending from the weld head that is in contact or near contact with the header tube to provide a relatively gas tight seal. The weld head and the collet form a chamber that contains the shielding gas in the vicinity of the joint between the branch tube and the header tube.

It is therefore an object of this invention to provide an improved T-Joint welding fixture for use in welding a branch tube to a header tube, said fixture comprising a frame member for supporting said fixture to the header tube, a clamp on said frame member for holding the branch tube in place relative to the header tube and said fixture, and a collet extending from said fixture into contact with the header tube, said fixture, said collet and said clamp forming a chamber for containing shielding gas in the vicinity of the joint between the branch tube and the header tube.

It is a further object of this invention to provide a method of welding a branch tube to a header tube comprising the steps of attaching a fixture to the header tube, holding the branch tube in place relative to the fixture and to the header tube by means of a clamp, forming a shielding gas chamber in the immediate vicinity of the joint between the header tube and the branch tube by means of a collet extending from the fixture into contact with the header tube surrounding the joint to be welded and the branch tube clamp, introducing shielding gas into the chamber defined by the welding fixture, and welding the branch tube to the header tube.

Other objects and advantages of the invention will be apparent from the following description, the accompanying drawings and the appended claims.

DESCRIPTION OF THE PREFERRED EMBODIMENT

Figure 1:
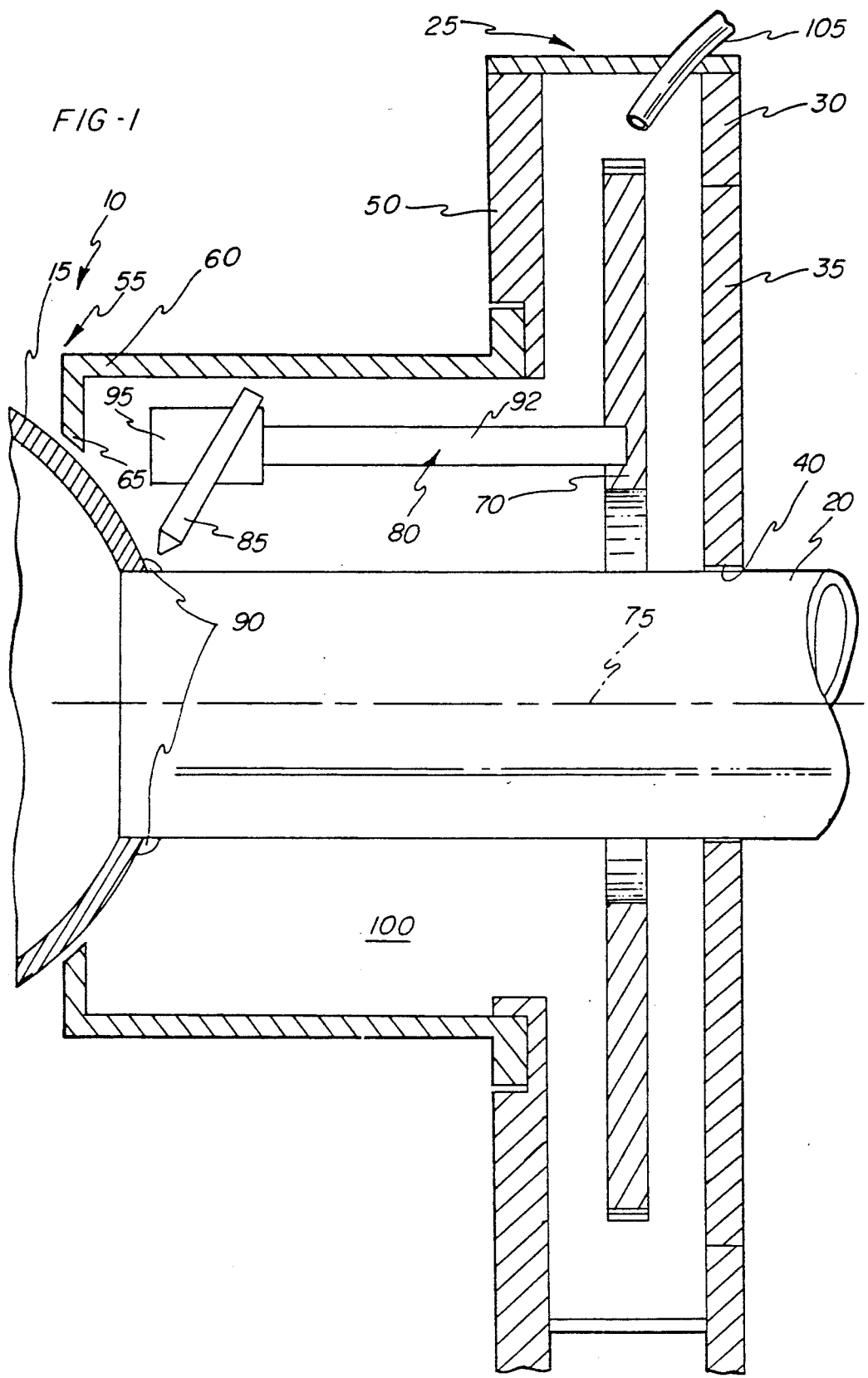
FIG. 1 is a schematic end elevational view of the present invention showing the elements that comprise the gas chamber surrounding the joint between a branch tube joined to a header tube.

Referring now to the drawings which illustrate a preferred embodiment of the invention, FIG. 1 is a schematic end elevational view showing a fixture generally at 10 that is mounted on a header tube 15 onto which a branch tube 20 is to be welded. Welding is performed by a modified welding head 25 of the type shown in U.S. Pat. No. 5,220,144.

The welding head 25 includes a clamp 30 for securing the branch tube 20 in place relative to the header tube 15. The clamp includes a removable collet 35 having an central opening 40 approximately the same diameter as the outer diameter of the branch tube 20. A second clamp mechanism 50 has been modified to by removing its collet, and in its place is placed a cassette collet 55 which has a cylindrical section 60 and a radial section 65. The radial section is designed to form a gas seal with the exterior surface of the header tube. It is not necessary to provide a gas tight seal.

Within the welding head 25 is a rotor or gear ring 70 having a gear on its outer circumference to rotate it about a center line 75. A motor and gear assembly, not shown in this drawing, but fully described in U.S. Pat. No. 5,220,144, causes the ring to rotate about the center line 75. A central opening in the ring 70 permits the branch tube freely to pass through the ring without interference.

A welding electrode assembly 80 is carried by the ring 70 to move a tungsten electrode 85 about the joint between the branch tube and the header tube to form a welded joint 90 to secure the branch tube 20 to the header tube 15. An arm 90 mounted to the ring 70 carries a head 95 which holds the electrode 85. The electrode is adjustable along its length and the head 95 is adjustable axially on the arm 90.

Thus, a chamber 100 is formed within the volume formed by the clamp 30 and collet 35, the outer surface of the welding head 25, the cassette collet 55 and the header tube 15. Within the chamber 100, the electrode 85 is free to rotate about the joint 90. Shielding gas is carried by a hose 105 and introduced into the chamber 100 through opening 110. The volume of the chamber is minimal and thus the atmosphere in the chamber 100 is quickly purged once shielding gas has been introduced. The seal formed between the cassette collet and the header tube is not air tight, but allows the atmosphere to escape as shielding gas is introduced. Since gas is constantly being pumped into the chamber, a positive pressure is maintained during the welding process, thus assuring proper shielding.

Figure 2:
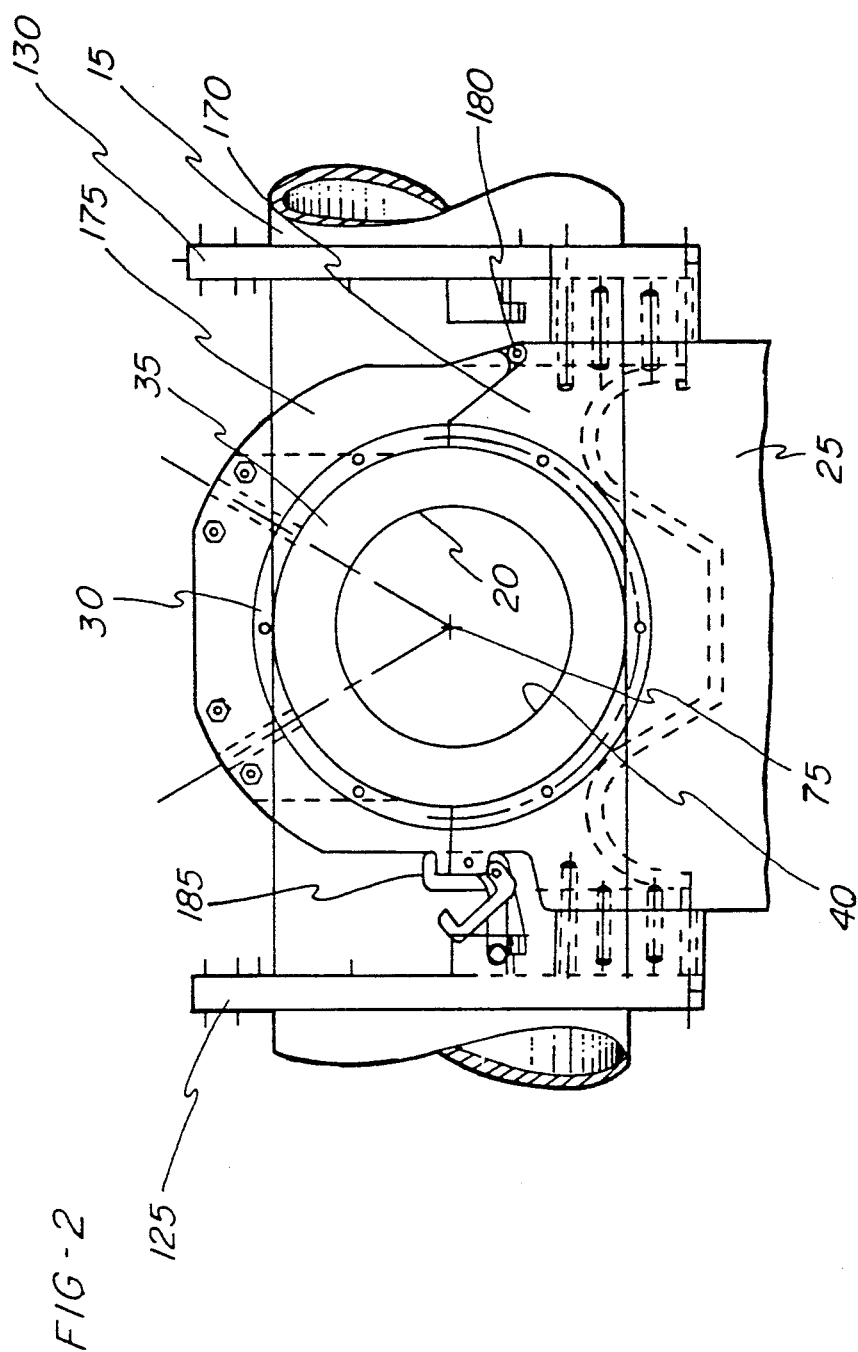
FIG. 2 is a plan view showing a welding head clamping a branch tube in place relative to a header tube, and further showing the clamps holding a fixture to a header tube.
Figure 3:
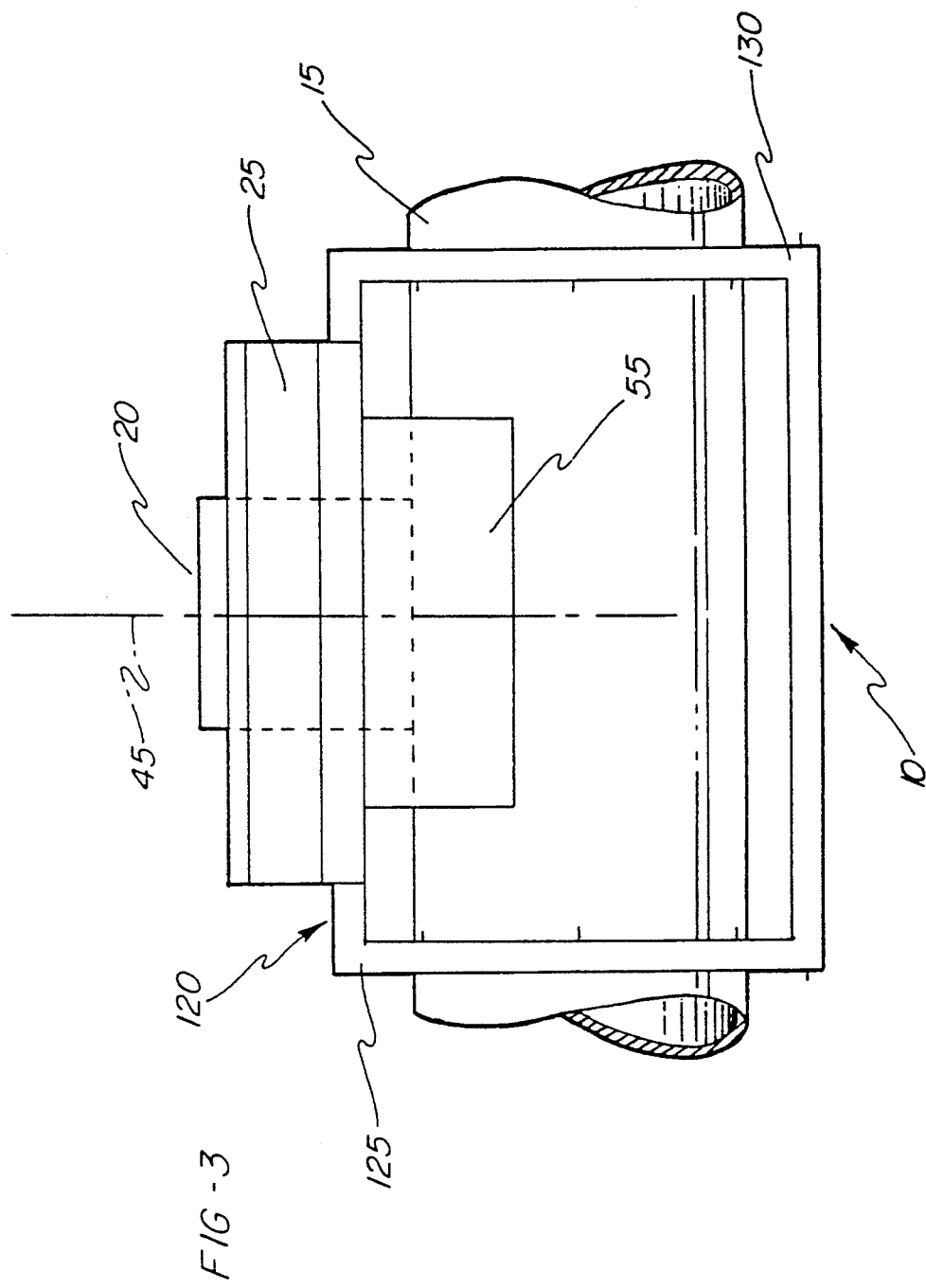
FIG. 3 is a side elevational view showing a fixture clamped to a header tube with a weld head holding a branch tube in place.
Figure 4:
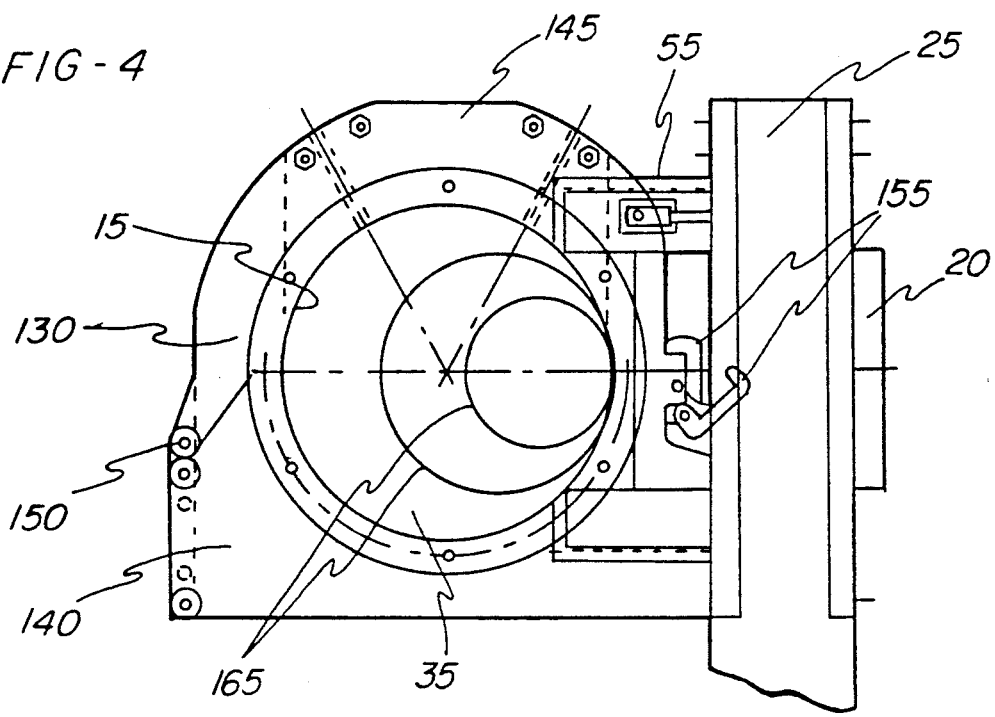
FIG. 4 is an end elevational view showing a fixture attached to a header tube and a weld head supporting a branch tube.

Referring now to FIGS. 2-4, the fixture 10 includes a frame 120 that supports the welding head 25 along with a pair of identical header tube clamps 125 and 130. These clamps are provided with header tube collets 135 to accommodate various diameters of header tubes 15. Each clamp includes a lower or base member 140 and an upper member 145. The upper member 145 is hinged at 150 and the two members are held closed by a locking device or latch 155.

Figure 5:
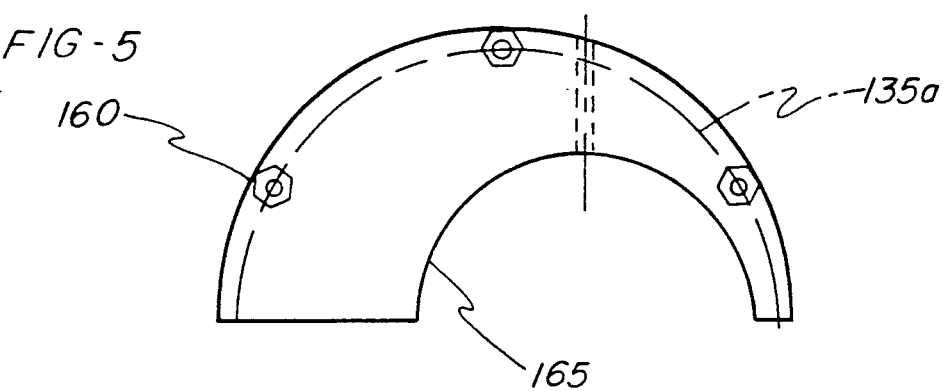
FIG. 5 is an elevational view of a top header fixture collet.
Figure 6:
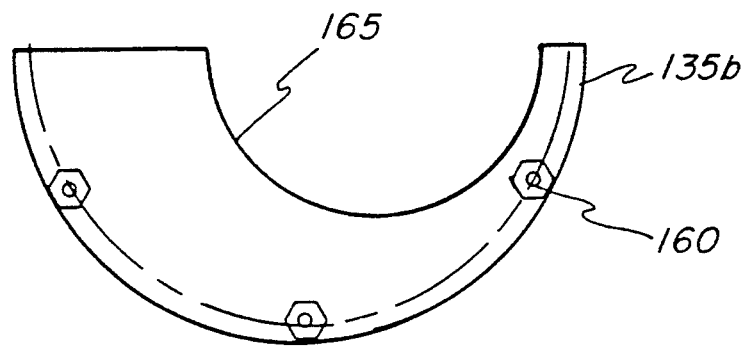
FIG. 6 is an elevational view of a bottom header fixture collet.

The header tube collet 135 includes two components, an upper half 135a (FIG. 5) and a lower half 135b (FIG. 6). Each half includes three mounting holes 160 to secure them to their respective clamps 140, 145. Further, each collet is designed to hold header tubes of various diameters tangent the right side of the clamp, toward the cassette collet 55 as viewed in FIG. 4. Thus, the center (the L dimension) and radius (the R dimension) of the opening 165 will vary according to the diameter or size of the particular header tube being used at the time.

The welding head clamp 30 includes a collet 35 having an opening 40, and as shown in FIG. 2, this collet holds the branch tube 20 centered on the center line 75. The clamp 30 also includes two components, a lower or base member 170 and an upper member 175. The upper member 175 is hinged at 180 and the two members are held closed by a locking device or latch 185. When the two halves are open, the branch tube 20 may be placed in its proper place relative to the header tube 15, and when the two members are locked, the branch tube will be held securely in place in readiness for the welding operation.

The second clamp mechanism 50 (FIG. 2) of the welding head shown in U.S. Pat. No. 5,220,144 has been modified. In the present invention, instead of another collet designed to fit around the tube 20, a cassette collet 55 is installed.

Figure 8:
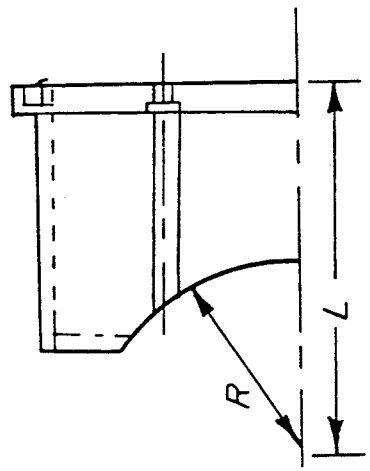
FIG. 8 is a side view of the top cassette collet of FIG. 7.
Figure 7:
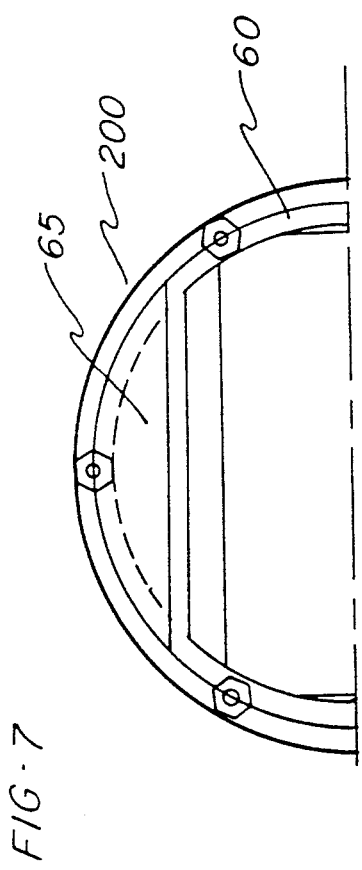
FIG. 7 is an elevational view of a top cassette collet.
Figure 10:
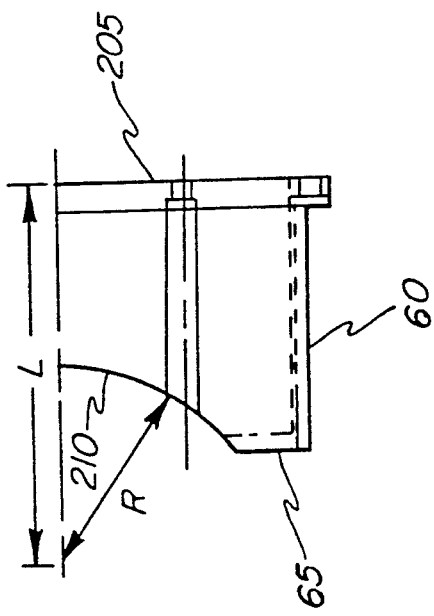
FIG. 10 is a side view of the bottom cassette collet of FIG. 9.
Figure 9:
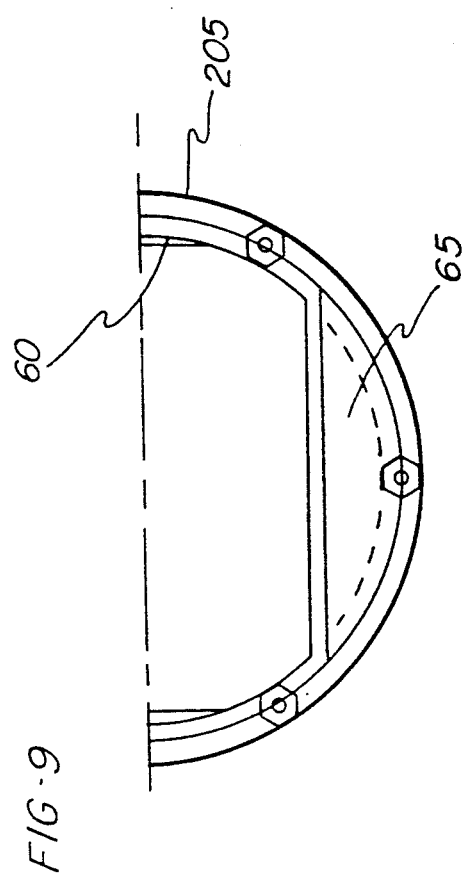
FIG. 9 is an elevational view of bottom cassette collet.

Referring to FIGS. 7-10, the cassette collet 55 is formed in two sections, an upper half 200 as shown in FIGS. 7 and 8, and an lower half 205 as shown in FIGS. 9 and 10. Each section includes a cylindrical section 60 and a radial section 65. The cylindrical section is formed with a cut-out 210 which is designed to fit against the header tube. As shown, there is designated an R dimension and an L dimension. These are the same as the R and L dimensions associated with the header tube collet shown in FIGS. 5 and 6 and are intended to permit header tubes of various diameters to be used with this invention.

The radial section is designed to place the collet against the header tube and to form a gas seal with the exterior surface of the header tube although it is not the intention to form a perfect gas tight seal, but merely to contain the shielding gas. In fact, as shielding gas is introduced into the chamber 100, the air within the chamber is allowed to escape through the interface formed between the cassette collet and the header tube.

In operation, a branch tube is welded to a header tube according to the following steps. First, the fixture 10 is attached to a header tube 15. This is done by selecting the appropriate size of collet 135, installing that collet into the clamps 125 and 130, and then securing the clamps. The branch tube is brought into place and one end is installed into an opening formed in the header tube, which opening has the same diameter as the outside diameter as the branch tube. The branch tube is held in place relative to the fixture and to the header tube by means of the clamp 30.

The welding electrode 85 is adjusted relative to the joint 90 to provide the proper spacing for welding. The proper size of the cassette collet 55 is selected according to the diameter of the header tube. Therefore, a shielding gas chamber 100 is formed in the immediate vicinity of the joint 90 between the header tube and the branch tube. This chamber is defined by the collet 55, the header tube itself, and the welding head 25, including the clamp 30 and collet 35. Shielding gas is introduced into the chamber 100 and the branch tube is welded to the header tube by rotating the ring 70, and thus the welding electrode around the joint.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is

1. A welding fixture for use in welding a branch tube to a header tube, said fixture comprising
    a frame member for supporting said fixture to the header tube,
    a clamp on said frame member for holding the branch tube in place relative to the header tube and said fixture,
    a collet extending from said fixture into contact with the header tube,
    said fixture, said collet and said clamp forming a chamber for containing shielding gas in the vicinity of the joint between the branch tube and the header tube
    means for introducing shielding gas into said chamber, and
    an orbital welding head surrounding the branch tube including a welding electrode mounted for rotation around a joint formed between the branch tube and the header tube.

2. A welding fixture for use in welding a branch tube to a header tube, said fixture comprising
    a frame member having first and second ends,
    a first clamp at said first end of said frame member for supporting said fixture on the header tube on one side of the branch tube,
    a second clamp at said second end of said frame member for supporting said fixture on the header tube on the other side of the branch tube,
    a third clamp on said frame member for holding the branch tube in place relative to the header tube and said fixture,
    a collet extending from said frame member into contact with the header tube,
    said fixture, said collet and said third clamp forming a chamber for containing shielding gas in the vicinity of the joint between the branch tube and the header tube,
    means for introducing shielding gas into said chamber, and
    an orbital welding head surrounding the branch tube including a welding electrode mounted for rotation around a joint formed between the branch tube and the header tube.

3. A method of welding a branch tube to a header tube comprising the steps of attaching a fixture to the header tube, holding the branch tube in place relative to the fixture and to the header tube by means of a clamp forming a shielding gas chamber in the immediate vicinity of the joint between the header tube and the branch tube by means of a collet extending from the fixture into contact with the header tube surrounding the joint to be welded and the branch tube clamp, introducing shielding gas into the chamber defined by the welding fixture, and welding the branch tube to the header tube by rotating a welding electrode around the joint formed between the branch tube and the header tube.

* * * * *